United States Patent Office.

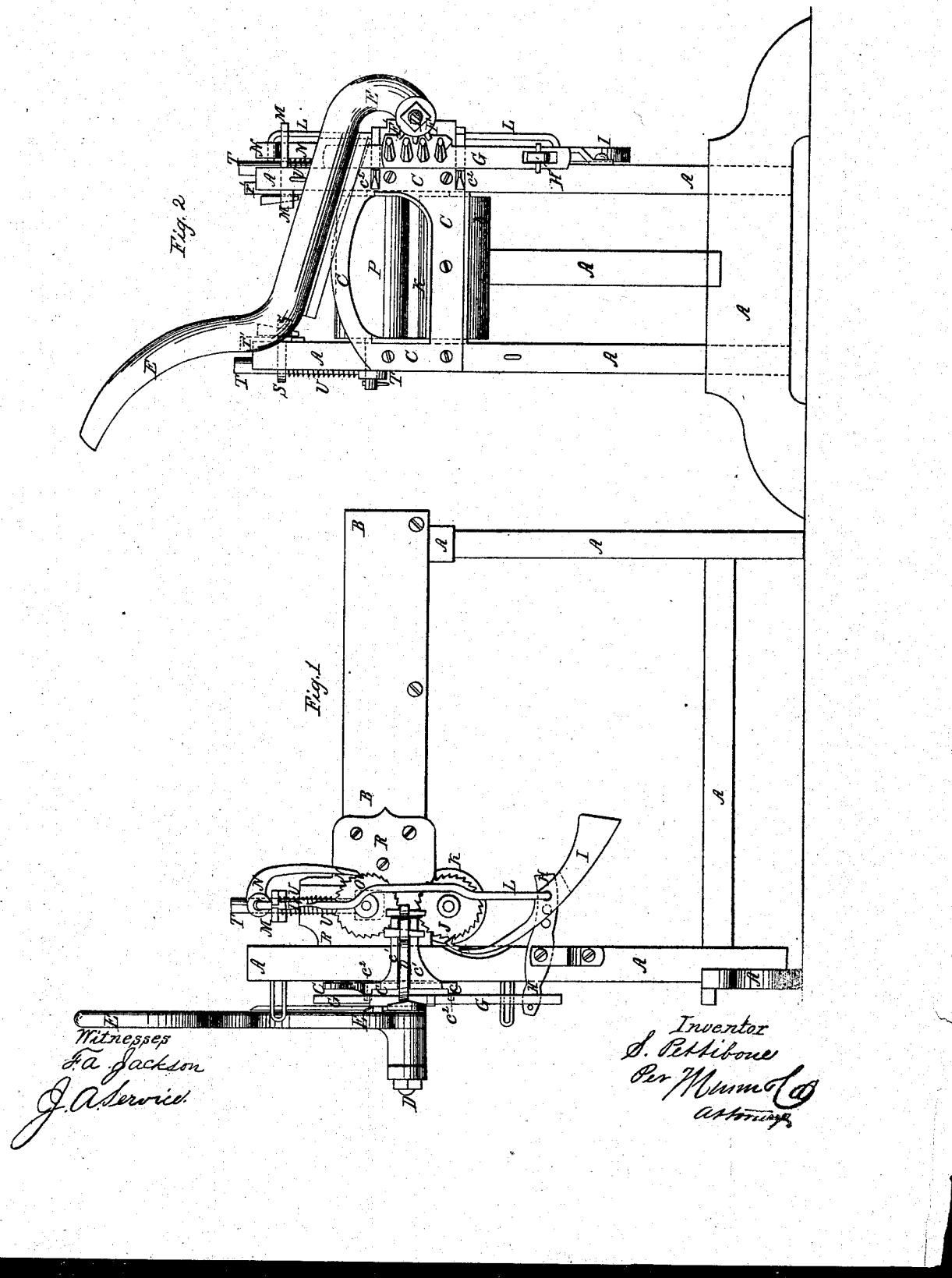

S. PETTIBONE, OF CORUNNA, MICHIGAN.

Letters Patent No. 66,386, dated July 2, 1867.

---

IMPROVEMENT IN STRAW-CUTTERS.

---

The Schedule referred to in these Letters Patent and making part of the same.

---

TO ALL WHOM IT MAY CONCERN:

Be it known that I, S. PETTIBONE, of Corunna, in the county of Shiawassee, and State of Michigan, have invented a new and improved Machine for Cutting Straw, &c.; and I do hereby declare that the following is a full, clear, and exact description thereof, which will enable others skilled in the art to make and use the same, reference being had to the accompanying drawings, forming part of this specification, in which—

Figure 1 is a side view of my improved straw-cutter.

Figure 2 is a front end view of the same.

Similar letters of reference indicate like parts.

My invention consists in the application of feed-rollers to the lever straw-cutter; in operating the feed-rollers by means of a toothed arm and cogs formed upon the hub of the knife-lever; in the combination of ratchet-wheels, pawls, connecting-rods, and lever with the feed-rollers and with the toothed arm; in the combination of metallic side pieces with the box-frame and upper roller of the cutter; and in the combination of adjustable guide-arms, guide-rods, and springs with the metallic side pieces, and with the upper feed-roller, the whole being constructed and arranged as hereinafter more fully described.

A is the frame of the cutter, and B is the feed-box. To the forward side of the frame A is attached a metallic frame, C, which forms the mouth of the feed-box and the plate against which the straw is cut. Upon the rear side of one end of the frame C is cast a slotted arm, $c^1$, to which the journal D of the knife-lever E is adjustably attached. The journal or axle D may be secured in place by keys, bolts, and nuts, or set-screws, as may be desired. Upon the side of the hub of the knife-lever E are formed cogs or teeth F, which mesh into teeth or cogs formed upon the side of the arm G, as shown in fig. 2. The arm G slides up and down between the lever E and the frame C, and is held forward against the cogs F by guides or projections $c^2$ formed upon the side of the frame C. To the lower end of the arm G is pivoted the end of the lever H, the middle part of which is pivoted to the side of the frame A, as shown in fig. 1. To the other or inner end of the lever H is pivoted the pawl I, the upper end of which is hooked, so as to take hold of the teeth of the ratchet-wheel J attached to the journal of the lower feed roller K. The lower end of the pawl I is weighted or made heavy to hold its hooked upper end forward against the teeth of the said ratchet-wheel J. L is a connecting-rod, the lower end of which is pivoted to the inner end of the lever H, and its upper end works up and down in a hole formed in the guide-arm M for its reception. To the upper end of the connecting-rod L is pivoted the pawl N, the lower end of which takes hold of the teeth of the ratchet-wheel O, attached to the journal of the upper feed-roller P, as shown in fig. 1. The rapidity of the feed is regulated by pivoting the pawl I and connecting-rod L nearer to or farther from the fulcrum of the lever H, for which purpose several holes are made through the end of the lever H, as shown; and the pawl I and rod L are pivoted to the same point of the lever H, so that the throw of the pawls I and N may be both changed in the same proportion. R are metal plates, the forward ends of which are securely attached to the frame A, and in the rear parts of which are formed recesses, in which the forward ends of the side-boards of the box B are secured. Upon the lower edges of the plates R are formed bearings for the lower or stationary roller K, and their upper parts are slotted vertically for the reception of the journals of the upper feed-roller P. Upon the upper edges of the plates R are formed upwardly projecting arms $r'$, upon which are placed adjustable guide-arms M and S, which may be secured in place by set-screws, by bolts and nuts, or by keys, as shown in the drawings. T are guide-rods, through holes in the lower ends of which pass the journals of the upper feed-roller P, and the upper ends of which pass up through holes in the guide-arms M and S. The roller P is held down, so as to exert the necessary pressure upon the straw or other substance being fed forward to the knife, by coiled springs U coiled around the rods T, the lower ends of said springs resting against shoulders formed upon the lower ends of said rods, and their upper ends against the under sides of the guide-arms M and S, as shown in figs. 1 and 2.

What I claim as new, and desire to secure by Letters Patent, is—

1. Operating the feed-rollers by means of a toothed arm, G, and cogs F, formed upon the hub of the knife-lever E, substantially as herein shown and described.

2. The combination of the ratchet-wheels O J, the pawls I N, connecting-rod L, and lever H with the feed-rollers K P and toothed arm G, substantially as herein shown and described and for the purpose set forth.

3. The combination of the adjustable guide-arms M S, guide-rods T, and coiled springs U with the metallic side pieces R, and with the upper feed-roller P, substantially as herein shown and described and for the purpose set forth.

S. PETTIBONE.

Witnesses:
 JOHN KEYS,
 H. McARTHUR.